United States Patent
Seki et al.

[11] Patent Number: 5,939,026
[45] Date of Patent: Aug. 17, 1999

[54] APPARATUS FOR PROCESSING GAS BY ELECTRON BEAM

[75] Inventors: Hirofumi Seki, Hitachi; Hirofumi Shirakata, Mito; Yasuro Hori, Gifu; Shigeo Shiono, Hitachi, all of Japan

[73] Assignee: Hitachi, Ltd., Tokyo, Japan

[21] Appl. No.: 08/999,399

[22] Filed: Dec. 29, 1997

[30] Foreign Application Priority Data

Jan. 31, 1997 [JP] Japan .................................. 9-018439

[51] Int. Cl.$^6$ ...................................................... A61L 2/02
[52] U.S. Cl. ........................... 422/121; 422/22; 422/186; 422/900; 250/201.2; 250/251; 250/396 ML; 204/157.15
[58] Field of Search .............................. 422/22, 120, 121, 422/186, 186.3, 900; 250/200, 201.1, 201.2, 205, 251, 396 R, 396 ML; 204/157.15

[56] References Cited

U.S. PATENT DOCUMENTS

| | | | |
|---|---|---|---|
| 3,941,670 | 3/1976 | Pratt, Jr. ..................................... | 422/22 |
| 4,042,325 | 8/1977 | Tensmeyer ................................ | 422/22 |
| 4,639,597 | 1/1987 | Shiokawa ......................... | 250/396 ML |
| 4,752,450 | 6/1988 | Dietrich et al. .......................... | 422/186 |
| 4,943,356 | 7/1990 | Dietrich et al. ...................... | 204/157.3 |
| 5,187,371 | 2/1993 | Matsui et al. ....................... | 250/396 R |

FOREIGN PATENT DOCUMENTS

| | | |
|---|---|---|
| 53-88656 | 8/1978 | Japan . |
| 8-164331 | 6/1996 | Japan . |
| 8-222173 | 8/1996 | Japan . |

*Primary Examiner*—Elizabeth McKane
*Assistant Examiner*—Fariborz Moazzam
*Attorney, Agent, or Firm*—Fay, Sharpe, Beall, Fagan, Minnich & McKee

[57] ABSTRACT

An electron beam gas processing apparatus includes a single vacuum vessel maintained at vacuum by means of a vacuum pump and first and second lenses are disposed in the vacuum vessel. An electron beam emitted from an electron source is focused by each of the lenses, and the electron beam is irradiated onto a processing gas in a duct. When the current value of the electron beam is increased as the concentration of NOx in the processing gas increases, the focal distance is decreased by increasing the intensity of magnetic fields or the intensity of electric fields of the lenses in accordance with the current value of a filament, the current value of an arc power supply and the gas pressure in a gas reservoir and the first lens is moved toward a draw-out electrode and the second lens is moved toward the duct, so that a parallel electron beam of constant diameter is formed and the electron beam can be prevented from being increased in focusing diameter.

12 Claims, 2 Drawing Sheets

APPARATUS FOR PROCESSING GAS BY ELECTRON BEAM

BACKGROUND OF THE INVENTION

The present invention relates to an apparatus for processing gas by an electron beam (electron beam gas processing apparatus) and more particularly to an electron beam gas processing apparatus suitable for performing the processing of removing/reducing harmful substances in gas, for example, NOx and SOx contained in an exhaust gas.

In order to process a gas exhausted from a thermal power plant, an electron beam gas processing apparatus for performing the process of desulfurization/denitration of the exhaust gas has hitherto been used. The electron beam gas processing apparatus has three vacuum chambers with differential pumping disposed in a reaction room serving as an atmospheric gas room into which an exhaust gas representing an object to be processed is guided or admitted, an electron beam chamber disposed adjacently to an outer differentially pumped chamber, and an electron beam source for irradiating an electron beam to the interior of the electron beam chamber through a draw-out electrode, whereby the electron beam generated from the electron beam source is irradiated on the exhaust gas in the reaction room through the draw-out electrode, electron beam chamber and individual differentially pumped chambers. The exhaust gas in the electron beam chamber and each of the differentially pumped chambers is evacuated by a vacuum pump such as a rotary pump and a constant degree of vacuum is maintained inside the respective chambers. A magnetic lens is disposed in each differentially pumped chamber in order that the electron beam guided to each differentially pumped chamber is focused by each magnetic lens so as to be focused on a designated position in the reaction room. By maintaining the degree of vacuum in the electron beam chamber and individual differentially pumped chambers at a designated value, the locus of the electron beam can be kept to be straight. Further, by changing the current of a filament arranged in the electron beam source, the current value of an arc power supply for generating an arc discharge in the electron beam source or the gas pressure inside the electron beam source or by changing the accelerating voltage applied to the accelerating electrode, the intensity of the electron beam can be adjusted.

In the conventional technique, by virtue of the provision of the plurality of differentially pumped chambers, the beam diameter of the electron beam can be increased but the vacuum pump must be provided in association with each differentially pumped chamber, thus making the construction complicated. Further, the magnetic lens in each differentially pumped chamber is fixedly disposed and therefore, when the filament current, arc current or gas pressure is changed or the accelerating voltage of the electron beam is changed in order to increase the beam current, the degree of focusing of the electron beam is changed and the electron beam cannot be guided to the designated position inside the reaction room. In addition, the electron beam generated from the electron beam chamber is irradiated in the form of a collimated beam and therefore, when a number of electron beams are desired to be irradiated, the electron beam source is forced to be increased in scale.

SUMMARY OF THE INVENTION

An object of the present invention is to provide an electron beam gas processing apparatus which can focus an electron beam on a designated position when processing gas even though the apparatus is simple in construction.

To accomplish the above object, an electron beam gas processing apparatus according to the present invention comprises a vacuum vessel having an inlet opening and an outlet opening, evacuation means for evacuating gas in the vacuum vessel, electron beam generation means for generating an electron beam and irradiating the electron beam into the inlet opening of the vacuum vessel, first electron beam focusing means for focusing the electron beam irradiated into the inlet opening of the vacuum vessel, and second electron beam focusing means for focusing the electron beam focused by the first electron beam focusing means and irradiating it onto a processing gas through the outlet opening.

Each of the first and second electron beam focusing means includes an electrostatic lens or a magnetic lens which changes the focal position of the electron beam in accordance with the intensity of an electric field or the intensity of a magnetic field.

Further, each of the first and second electron beam focusing means includes lens position adjusting means for adjusting the position of the electrostatic lens or magnetic lens on the basis of adjustment by focal position adjusting means.

With the above construction, an electron beam is guided into the single vacuum vessel, the electron beam inside the vacuum vessel is focused by the first and second electron beam focusing means and the focused electron beam is irradiated on a processing gas, thereby ensuring that the electron beam can be focused onto a designated position in the processing gas. Since the intensity of the electric field of the electrostatic lens or the intensity of the magnetic field of the magnetic lens and the position of the electrostatic lens or magnetic lens are adjusted in accordance with the filament current value, the current value of arc discharge, the gas pressure or the accelerating voltage value, the gas processing can be carried out efficiently in accordance with the concentration of harmful substances in the processing gas.

DESCRIPTION OF THE PREFERRED EMBODIMENTS

Preferred embodiments of the present invention will be described hereunder with reference to the accompanying drawings.

Figure 1:
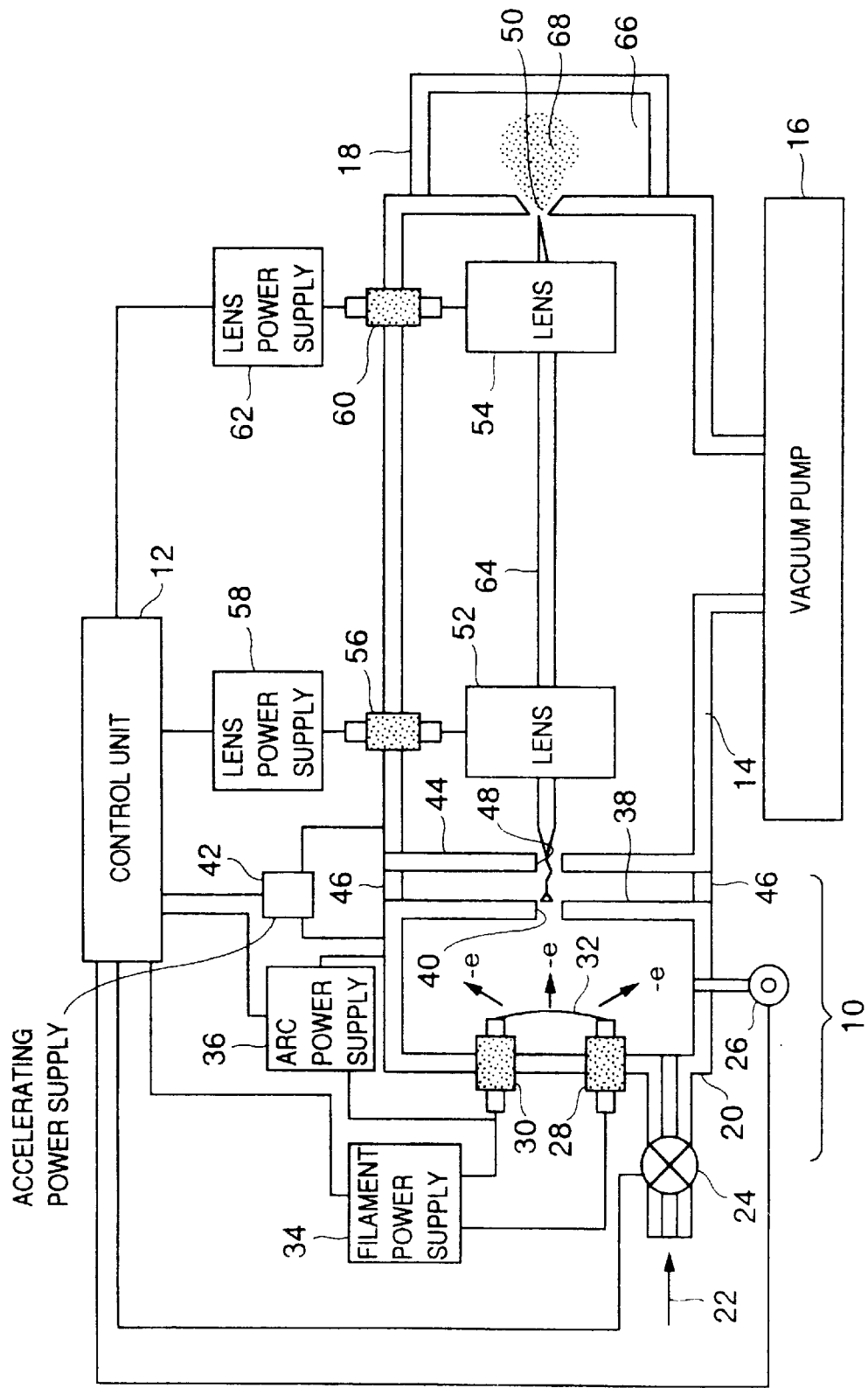
FIG. 1 is a schematic diagram showing the overall construction of an electron beam gas processing apparatus according to an embodiment of the present invention.

Referring to FIG. 1, there is illustrated an overall construction of an electron beam gas processing apparatus according to an embodiment of the present invention. The electron beam gas processing apparatus shown in FIG. 1 comprises a filament type electron source 10, a control unit (control system) 12, a vacuum vessel 14 and a vacuum pump 16. The electron source 10 is disposed at one end of the vacuum vessel 14 and a duct 18 is connected to the other end of the vacuum vessel 14.

The electron source 10 includes a gas reservoir 20 which reserves gas for generation of plasma, and a gas 22 such as argon can be guided to the gas reservoir 20 via a valve 24. Inserted in the wall of the gas reservoir 20 are a vacuum gauge 26 adapted to measure the gas pressure inside the gas reservoir 20 and hermetically sealed (electrical) terminals 28 and 30. A value measured by the vacuum gauge 26 is inputted to the control unit 12. The current intake terminals 28 and 30 are connected on one hand with a filament 32 and on the other hand with a filament power supply 34. An arc power supply 36 is then connected to the current intake terminal 30 and the wall of the gas reservoir 20. The filament power supply 34 and arc power supply 36 are separately connected to the control unit 12 so that current values of the respective power supplies may be adjusted in accordance with commands from the control unit 12. When current from the filament power supply 34 is fed to the filament 32, thermions are emitted from the filament 32. Under the condition that arc current is adjusted by the arc power supply 36, an arc discharge occurs between the filament 32 and the wall of the gas reservoir 20 to generate plasma in the gas reservoir 20. A wall surface of the gas reservoir 20 is constructed of an accelerating electrode 38 and an opening 40 for expelling electrons prevailing in the gas reservoir 20 is formed in the accelerating electrode 38 nearly at a central portion thereof. The accelerating electrode 38 is connected to an accelerating power supply 42 and electrons leaking from the opening 40 are accelerated by means of the accelerating electrode 38 so as to be guided into the vacuum vessel 14. A draw-out electrode 44 is provided to oppose the accelerating electrode 38.

The draw-out electrode 44 is jointed to the accelerating electrode 38 through the medium of an insulating flange 46, thus forming a wall surface of the vacuum vessel 14. An inlet opening 48 upon which electrons from the opening 40 are incident is formed in the draw-out electrode 44 nearly at a central portion thereof. In other words, the electron source 10 constitutes an electron beam generation means which irradiates electrons, generated in the gas reservoir 20 and taking the form of an electron beam, into the inlet opening 48 of the vacuum vessel 14. Gas piping, a plasma trapping magnet and water cooling jacket provided in association with the electron source 10 are not illustrated.

In the vacuum vessel 14, an outlet opening 50 opposes the inlet opening 48 and a first lens 52 and a second lens 54 are disposed on an electron beam propagation path connecting the inlet and outlet openings 48 and 50. Gas inside the vacuum vessel 14 is evacuated by the action of the vacuum pump 16, so that the degree of vacuum inside the vacuum vessel 14 is kept to be constant. The first and second lenses 52 and 54 are movably arranged along the electron beam propagation path, with the first lens 52 being connected to a power supply 58 for lens via a current intake terminal 56 and the second lens 54 being connected to a power supply 62 for lens via a current intake terminal 60. The lens power supplies 58 and 62 are separately connected to the control unit 12 in order that current or voltage of the respective power supplies 58 and 62 can be controlled by commands from the control unit 12. Each of the first and second lenses 52 and 54 is constructed of, for example, either a magnetic lens having an air-core or iron-core-coil or an electrostatic lens having a plurality of electrode plates each formed with an electron beam transmission hole. In other words, the focal position of an electron beam can be changed in accordance with the intensity of a magnetic field of the magnetic lens or the intensity of an electric field of the electrostatic lens. An electron beam 64 guided into the vacuum vessel 14 is focused by the first lens 52 and then by the second lens 54. In this case, the electron beam 64 is formed into a parallel beam by means of the first lens 52 and is focused on a designated position in the duct 18 by means of the second lens 54. Namely, the first lens 52, lens power supply 58 and control unit 12 constitute first electron beam focusing means and focal distance adjusting means, and the second lens 54, lens power supply 62 and control unit 12 constitute second electron beam focusing means and focal distance adjusting means.

On the other hand, a gas exhausted from, for example, a thermal power plant is guided as processing gas 66 into the duct 18 and when the electron beam 64 is irradiated on the processing gas 66, an electron cloud 68 is formed in the processing gas 66. In other word, with the electron beam 64 irradiated on the processing gas 66, the electron beam 64 is distributed in the form of a cloud. Under the irradiation of the electron beam 64 on the processing gas 66, the electron beam 64 collides with molecules of the processing gas 66 to form chemically active substances (radicals). By adding ammonia to these substances, a fertilizer such as ammonium sulfate or ammonium nitrate can be formed and SOx or NOx contained in the exhaust gas can be decreased.

Next, the operation of the present embodiment will be described.

As an example, an instance will be considered here in which the concentration of NOx in the processing gas 66 representing an object to be processed is increased temporarily and therefore, the current value of the electron beam 64 is desired to be increased. To this end, the current value of the filament 32 is increased, the current of the arc power supply 36 is increased or the gas pressure inside the gas reservoir 20 is increased by adjusting the valve 24. With the current value of the electron beam 64 increased, the shape of a sheath of plasma is changed at the accelerating electrode 38, thereby changing (increasing) the divergent angle of the electron beam 64. Further, while being increased in divergent angle, the electron beam 64 is decreased in focusability. At that time, if the conditions for control of the first and second lenses 52 and 54 remain unchanged, then the electron beam 64 cannot be focused on the designated position. Thus, in the present embodiment, the condition of each of the first and second lenses 52 and 54 is controlled by a command from the control unit 12 in accordance with a current value of filament 32, a current value of arc current or a gas pressure.

More specifically, the condition of the valve 24 serving as a gas pressure regulator, the filament current of filament power supply 34, the arc current of arc power supply 36 and the degree of opening of the valve 24 are monitored by the control unit 12, and the intensity of magnetic fields or the intensity of electric fields of the first and second lenses 52 and 54 are increased in accordance with a filament current value, an arc current value or a gas pressure to shorten the focal distance of each lens. Further, in order to obtain a parallel electron beam of the same diameter as before or constant diameter, the position of the first lens 52 is moved toward the draw-out electrode 44 by a moving means (not shown). In addition, the electron beam 64 is prevented from being increased in focusing diameter or focal spot by shortening the focal distance of the second lens 54 and the position of the second lens 54 is caused to approach the outlet opening 50 by means of a moving means (not shown). Through execution of a control operation as above, the electron beam 64 can be focused on the designated position in the processing gas 66 even when the current value of the electron beam 64 is increased. When the current value of the electron beam 64 is desired to be decreased, the focal distance of each lens is increased by decreasing the intensity of magnetic fields or the intensity of electric fields of the first and second lenses 52 and 54 in accordance with a filament current value, an arc current value or a gas pressure. Further, for the purpose of obtaining a parallel electron beam of the same diameter or constant diameter, the position of the first lens 52 is so changed as to deviate from the draw-out electrode 44 and the position of the second lens 54 is so changed as to deviate from the outlet opening 50.

On the other hand, when the processing quantity of NOx is desired to be increased by increasing the accelerating voltage, the focal distance of each lens is also controlled so as to be decreased by increasing the intensity of magnetic fields or the intensity of electric fields of the first and second lenses 52 and 54. In this case, equality of the diameter of the electron beam 64 can be maintained and besides, the electron beam 64 can be prevented from being increased in focusing diameter or focal spot by adjusting only the focal distance without changing the position of each of the first and second lenses 52 and 54.

Since, in the present embodiment, vacuum can be maintained inside the single vacuum vessel 14 by means of the vacuum pump 16 and the two lenses 52 and 54 are disposed in the vacuum vessel 14 in order that the electron beam 64 is focused by the individual lenses, the construction can be simplified and the electron beam 64 can be focused on the designated position in the processing gas 66. Further, the focal distance and the position of each of the lenses 52 and 54 are controlled in accordance with the current value of the electron beam 64 and the accelerating voltage and consequently, the gas processing can be carried out efficiently in accordance with the concentration of harmful substances such as for example NOx and SOx contained in the processing gas 66.

In the present embodiment, the bucket type electron source 10 employing the filament 32 has been described as being used as the electron source 10 but alternatively, a filament type electron source for accelerating thermions emitted from a heated solid substance or a microwave type electron source for generating plasma by feeding a microwave power into a gas may be used as the electron source. In any of the alternative electron sources, by controlling the focal distance and the position of each of the lenses 52 and 54 as in the case of the foregoing embodiment, the electron beam can be kept to be a parallel beam of constant diameter regardless of the current value of the electron beam and besides, can be prevented from being increased in focusing diameter. Especially, in the case of the microwave type electron source, the focal distance and the position of each of the lenses 52 and 54 can be controlled in accordance with feeding a microwave power.

In the foregoing embodiment, the magnetic lens or the electrostatic lens can be used as the first lens 52 but preferably, the magnetic lens rather than the electrostatic lens may be used as the second lens 54 in order that the electron beam 64 can be focused regardless of a decrease in electrical dielectric strength due to inflow of the processing gas 66 from the outlet opening 50.

Figure 2:
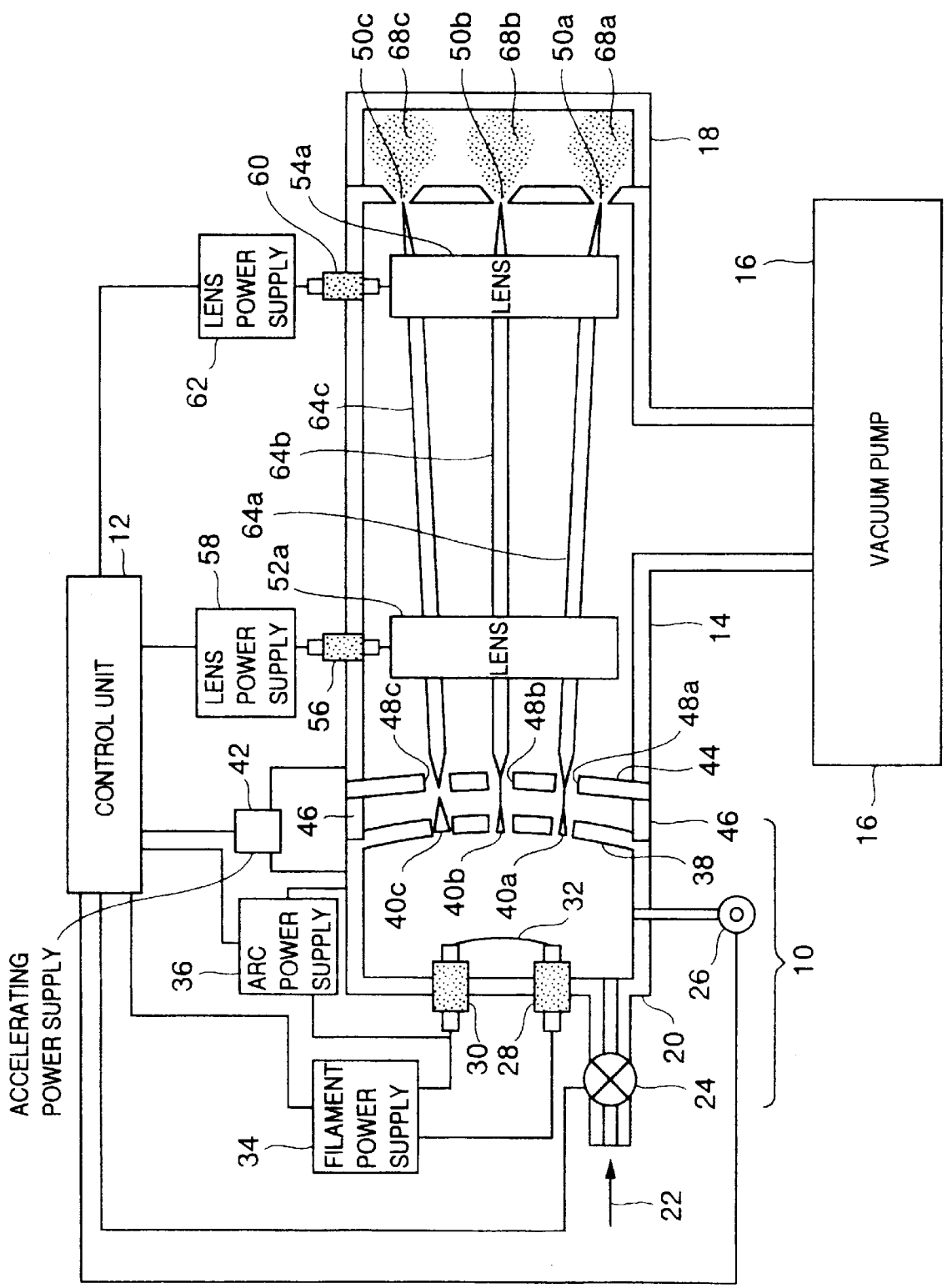
FIG. 2 is a schematic diagram showing the overall construction of an electron beam gas processing apparatus according to another embodiment of the invention.

Next, an embodiment using a plurality of electron beams will be described with reference to FIG. 2.

In this embodiment, for generation of three electron beams 64a, 64b and 64c, openings 40a, 40b and 40c are formed in an accelerating electrode 38 and three inlet openings 48a, 48b and 48c are formed in a draw-out electrode 44. Three outlet openings 50a, 50b and 50c are then formed in the side wall of a duct 18 adjacent to a vacuum vessel 14. First and second lenses 52a and 54a have each coils or electrode plates for focusing the electron beams 64a, 64b and 64c, respectively. In forming the openings 40a to 40c and the inlet openings 48a to 48c, their position and shape are determined by taking the following points into consideration. More particularly, with the aim of reducing the mutual influence of individual magnetic lenses of the second lens 54a, the distance between adjacent ones of the electron beams 64a, 64b and 64c is increased as the electron beams deviate from the electron source 10. Further, in a region between the electron source 10 and the second lens 54a, an angle contained by loci of any two of the electron beams 64a, 64b and 64c is made to be larger than 0° and smaller than 90°. With the angle contained by loci of the individual electron beams set to be larger than 0° and smaller than 90°, the mutual influence of adjacent magnetic lenses can be excluded when each of the first and second lenses 52a and 54a is constructed of a plurality of magnetic lenses and besides, mutual overlap of electron clouds 68a, 68b and 68c formed by the electron beams coming into the duct 18 can be prevented, with the result that the gas processing can be carried out efficiently. Namely, irradiation of the electron beams 64a to 64c can be uniform inside the duct 18 to permit the gas processing to be carried out efficiently.

In the present embodiment, too, when the current value of the electron beam is desired to be increased sympathetically with a temporary increase in NOx concentration in a gas, the focal distance is decreased by increasing the intensity of magnetic fields or the intensity of electric fields of the first and second lenses 52a and 54a in accordance with a filament current value, an arc current value and a gas pressure and in addition, the first lens 52a is moved toward the draw-out electrode 44 and the second lens 54a is moved toward the outlet 50a to 50c as in the foregoing embodiment, thereby ensuring that the electron beams 64a to 64c can be formed into parallel beams of constant diameter and the electron beams 64a to 64c irradiated onto the gas can be prevented from being increased in focusing diameter.

In the present embodiment, when an electrostatic lens is used as the first lens 52a, a plurality of parallel electron beams can be obtained by arranging a plurality of electrode plates each formed with a plurality of holes and therefore, the cost can be more reduced than in the case where a magnetic lens is used as the first lens 52a. On the other hand, when an iron-core coil, rather than an air-core coil, is used for the second lens 54a and an iron core having a relative permeability of 10000 or more is used, the mutual influence of magnetic fields of the individual magnetic lenses can be reduced to facilitate focusing of the electron beams 64a to 64c.

In the present embodiment, the use of three electron beams has been described but the number of electron beams is not limitative and the present invention may be applied to the use of two electron beams or more than three electron beams.

In an application example of the electron beam gas processing apparatus of the foregoing embodiments, an electron beam can be irradiated onto a processing gas containing oxygen to permit efficient formation of ozone.

In another application example of the electron gas processing apparatus of the foregoing embodiments, an application to laser oscillation is available. More specifically, a vessel constituting a gas chamber is disposed between a pair of resonator mirrors of different reflectivities, for example, a resonator mirror of 100% reflection and a resonator mirror of 50% reflection, at least one of helium gas, argon gas, neon gas, xenon gas, carbon-dioxide gas, hydrogen gas, nitrogen gas and oxygen gas or a mixture gas of two or more of these gases is contained in the gas chamber, and an electron beam is irradiated into the gas chamber to permit efficient laser oscillation.

As described above, according to the present invention, since an electron beam is guided into the single vacuum vessel and the electron beam inside the vacuum vessel is focused by two systems of electron beam focusing means, the construction can be simplified. Further, the focal distance and the position of lenses of the two systems are controlled in accordance with the current value of electron beam and the accelerating voltage and hence the gas processing can be carried out efficiently in accordance with the concentration of harmful substances in a processing gas.

We claim:

1. An electron beam gas processing apparatus comprising:
   a vacuum vessel having an inlet opening and an outlet opening;
   evacuation means for evacuating gas in said vacuum vessel;
   electron beam generating means for generating an electron beam and irradiating the electron beam into said inlet opening of said vacuum vessel;
   first electron beam focusing means for focusing the electron beam irradiated into said inlet opening of said vacuum vessel; and
   second electron beam focusing means for focusing the electron beam focused by said first electron beam focusing means and irradiating it onto a processing gas under atmospheric pressure through said outlet opening;
   wherein each of said first and second electron beam focusing means includes an electrostatic lens which changes the focal position of the electron beam in accordance with the intensity of an electric field or a magnetic lens which changes the focal position of the electron beam in accordance with the intensity of a magnetic field; and
   wherein each of said lenses is movable along a path of said electron beam between said inlet and outlet openings.

2. An electron beam gas processing apparatus according to claim 1, wherein said electron beam generating means has an electron source including a gas reservoir having an opening in communication with said inlet opening of said vacuum vessel and containing a gas for plasma generation, a filament disposed in said gas reservoir and operative to emit thermions, a filament power supply for adjusting current of said filament, an arc power supply for generating an arc discharge between said filament and the wall of said gas reservoir, and a gas pressure regulator for adjusting the pressure of the gas in said gas reservoir, and wherein each of said first and second electron beam focusing means includes focal distance adjusting means for adjusting the intensity of the electric field of the electrostatic lens or the intensity of the magnetic field of the magnetic lens in accordance with at least one of the filament current value, the current value of arc discharge and the gas pressure in said gas reservoir.

3. An electron beam gas processing apparatus according to claim 1, wherein said electron beam generating means includes a filament type electron source for accelerating thermions emitted from a heated solid substance and an accelerating power supply for accelerating an electron beam generated from said filament type electron source, and wherein each of said first and second electron beam focusing means includes focal distance adjusting means for adjusting the intensity of the electric field of the electrostatic lens or the intensity of the magnetic field of the magnetic lens in accordance with at least one of the beam current value of said filament type electron source and the accelerating voltage of said accelerating power supply.

4. An electron beam gas processing apparatus according to claim 1, wherein said electron beam generation means includes a microwave electron source for generating plasma by using a microwave and an accelerating power supply for accelerating an electron beam generated from said microwave electron source, and wherein each of said first and second electron beam focusing means includes focal distance adjusting means for adjusting the intensity of the electric field of the electrostatic lens or the intensity of magnetic field of the magnetic lens in accordance with at least one of the beam current value of said microwave electron source and the accelerating voltage of said accelerating power supply.

5. An electron beam gas processing apparatus according to claim 1, wherein each of said first and second electron beam focusing means includes lens position adjusting means for adjusting the position of said electrostatic lens or magnetic lens on the basis of adjustment by focal position adjusting means.

6. An electron beam gas processing apparatus according to claim 1, wherein an electrostatic lens is used for said first electron beam focusing means and a magnetic lens is used for said second electron beam focusing means.

7. An electron beam gas processing apparatus according to claim 6, wherein said vacuum vessel is formed with a plurality of inlet openings and a plurality of outlet openings, electron beams are irradiated from said electron beam generating means into said inlet openings, respectively, the electron beans are irradiated onto the processing gas from said respective outlet openings, said individual inlet openings are shaped and positioned such that the mutual distance between the respective electron beams is increased as the respective electron beams deviate from said respective inlet openings, and each of said first and second electron beam focusing means focuses the plurality of electron beams.

8. An electron beam gas processing apparatus according to claim 7, wherein an angle contained by loci of the plurality of electron beams irradiated to said first electron beam focusing means from said electron beam generating means through said vacuum vessel is set to be larger than 0° and smaller than 90°.

9. An electron beam gas processing apparatus according to claim 1, wherein said magnetic lens uses an iron-core coil and the iron core is set to have a relative permeability of 10000 or more.

10. An electron beam gas processing apparatus according to claim 1, wherein said apparatus is applied to formation of ozone by irradiating an electron beam onto a processing gas containing oxygen.

11. An electron beam gas processing apparatus according to claim 1, wherein said apparatus is applied to reduction of harmful substances in a processing gas by irradiating an electron beam onto the processing gas containing the harmful substances.

12. An electron beam gas processing apparatus according to claim 8, wherein said magnetic lens uses an iron-core coil and the iron core is set to have a relative permeability of 10000 or more.

* * * * *